No. 832,345. PATENTED OCT. 2, 1906.
H. P. A. J. SMULDERS.
DISINTEGRATOR FOR SUCTION DREDGERS.
APPLICATION FILED OCT. 10, 1905.

2 SHEETS—SHEET 1.

WITNESSES
INVENTOR
Henricus Petrus Augustinus Johannes Smulders
By
ATTORNEYS

No. 832,345. PATENTED OCT. 2, 1906.
H. P. A. J. SMULDERS.
DISINTEGRATOR FOR SUCTION DREDGERS.
APPLICATION FILED OCT. 10, 1905.

2 SHEETS—SHEET 2.

WITNESSES

INVENTOR

ATTORNEYS

UNITED STATES PATENT OFFICE.

HENRICUS PETRUS AUGUSTINUS JOHANNES SMULDERS, OF ROTTERDAM, NETHERLANDS.

DISINTEGRATOR FOR SUCTION-DREDGERS.

No. 832,345. Specification of Letters Patent. Patented Oct. 2, 1906.

Application filed October 10, 1905. Serial No. 282,200.

*To all whom it may concern:*

Be it known that I, HENRICUS PETRUS AUGUSTINUS JOHANNES SMULDERS, engineer, a subject of the Queen of the Netherlands, and a resident of Rotterdam, Netherlands, have invented certain new and useful Improvements in Disintegrators for Suction-Dredgers, of which the following is a specification.

Suction - dredgers which are to work in earth of moderate hardness—such as soft clay, a hard clay, agglomerated sand, sand mixed with layers of clay, marl, or soft stone— have disintegrating appliances for breaking up the earth in the first instance. Existing disintegrators of the kind suffer from the inconvenience that they require a gear or some organ for transmitting power placed underneath the water, and consequently highly liable to deterioration.

The present invention relates to a disintegrator for a suction-dredger comprising at the end of the suction-pipe one or more disintegrators in the form of a cork-screw, the blade or blades of which are perforated and carry knives, the disintegrator requiring no gearing beneath the water for its actuation.

In the accompanying drawings, three modifications of a disintegrator according to the invention are shown by way of example.

Figure 3:
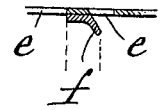
Figure 1:
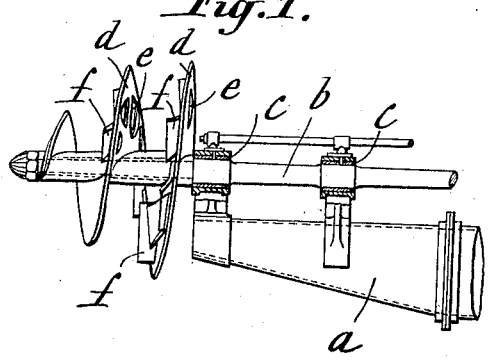
Figure 2:
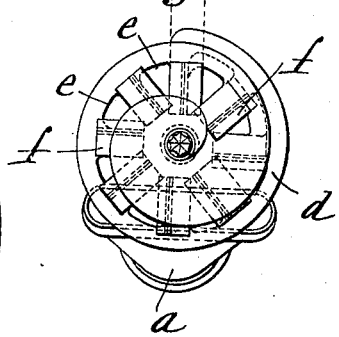
Figure 4:
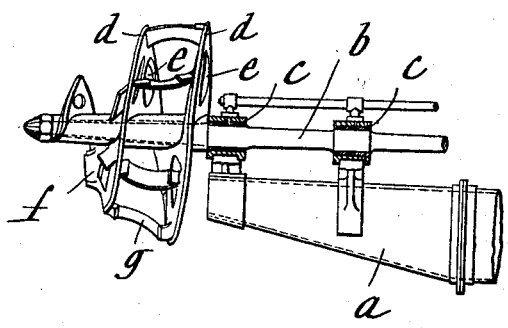
Figure 5:
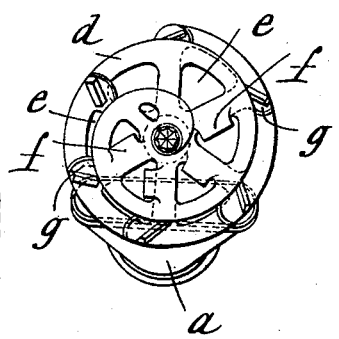
Figure 6:
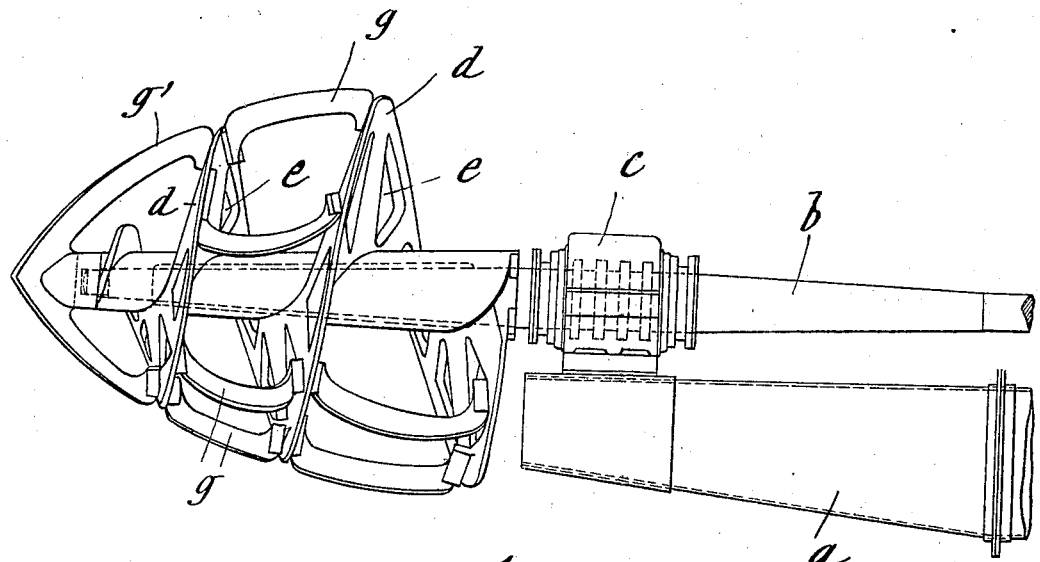
Figure 7:
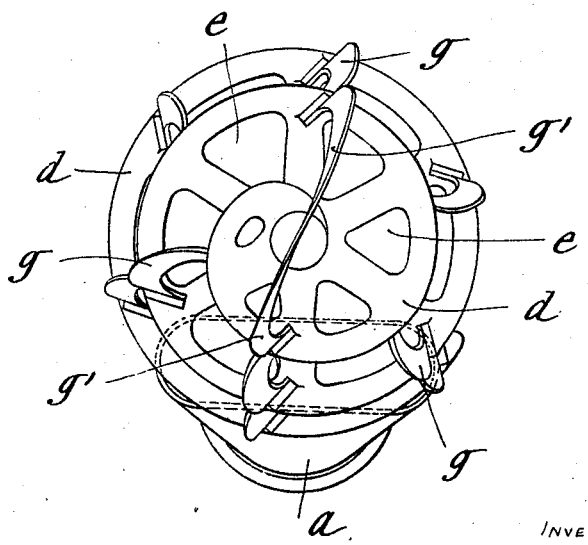

Figure 1 is a sectional elevation; Fig. 2, an end view, and Fig. 3 a sectional detail view, of one modification. Figs. 4 and 5 are a sectional elevation and an end view, respectively, of the second modification. Figs. 6 and 7 are an elevation and an end view, respectively, of the third modification on a larger scale.

*a* is the suction-pipe of the dredger, and *b* a shaft rotating in bearings *c*, fixed to the suction-pipe. This shaft is of sufficient length to be actuated by gearing above the surface of the water and carries at its lower end the disintegrator *d*, which has the form of a cork-screw or conical helix. The blade constituting the turns of the helix is perforated in places, as at *e*, so that the perforations pass in front of the entrance to the suction-pipe when the disintegrator is turning. At the edges of the perforations are fixed inclined interchangeable knives *f*, which cut and subdivide the earth as the disintegrator penetrates it like a screw and advances regularly under the influence of a suitable pressure and speed of rotation.

Knives having the shape shown at *g* in Figs. 4 and 5 may be provided between the largest turns of the helix, near the base thereof, so as to strengthen the same.

Further strengthening and cutting effect may also be obtained by means of a front knife *g'*, (shown in Figs. 6 and 7,) forming an angle the apex of which is situated on the center line of shaft *b*.

Having now described my invention, what I claim as new, and desire to secure by Letters Patent, is—

1. A disintegrator for suction - dredgers comprising a conical helix fixed to the end of a revolving shaft which extends parallelly to the suction-pipe, the turns of said conical helix thus passing in front of the entrance to said suction-pipe, said turns being provided with holes and with angular knives, so as to produce a thorough subdivision of the earth, substantially as described.

2. A disintegrator for suction - dredgers comprising a conical helix fixed to the end of a revolving shaft which extends parallelly to the suction-pipe, the turns of said conical helix thus passing in front of the entrance to said suction-pipe, said turns being provided with holes and with angular knives, the last turns near the base of the disintegrator being provided with knives extending longitudinally between the successive turns, so as to subdivide the earth and at the same time to strengthen said last turns, substantially as described.

3. A disintegrator for suction - dredgers comprising a conical helix fixed to the end of a revolving shaft which extends parallelly to the suction-pipe, the turns of said conical helix thus passing in front of the entrance to said suction-pipe, said turns being provided with holes and with longitudinally-arranged knives extending between successive turns, and a two-armed front knife forming the apex of the disintegrator and buttressing the front part of the helix, substantially as described.

In witness whereof I have hereunto set my hand in presence of two witnesses.

HENRICUS PETRUS AUGUSTINUS
                JOHANNES SMULDERS.

Witnesses:
  SEVERIEN HAMER,
  JOHAS DEDERICH DEEPECHIRE.